Dec. 29, 1959  H. B. UNDERWOOD ET AL  2,919,077
FISHING REEL OF THE TYPE KNOWN AS SPINNING REEL
Filed March 5, 1954  2 Sheets-Sheet 2
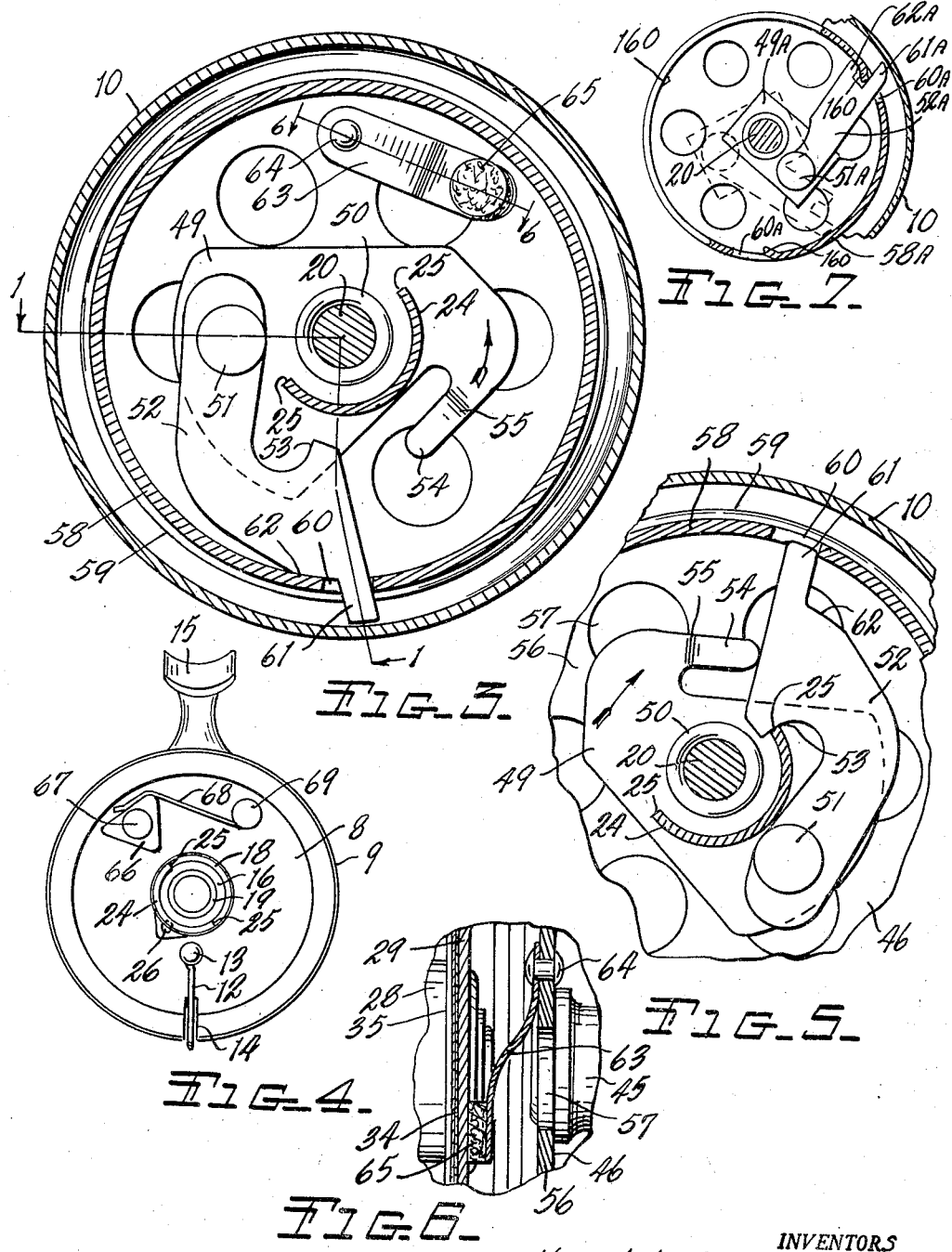
INVENTORS
Harold B. Underwood
Gerald D. Harrington
By
Attorney

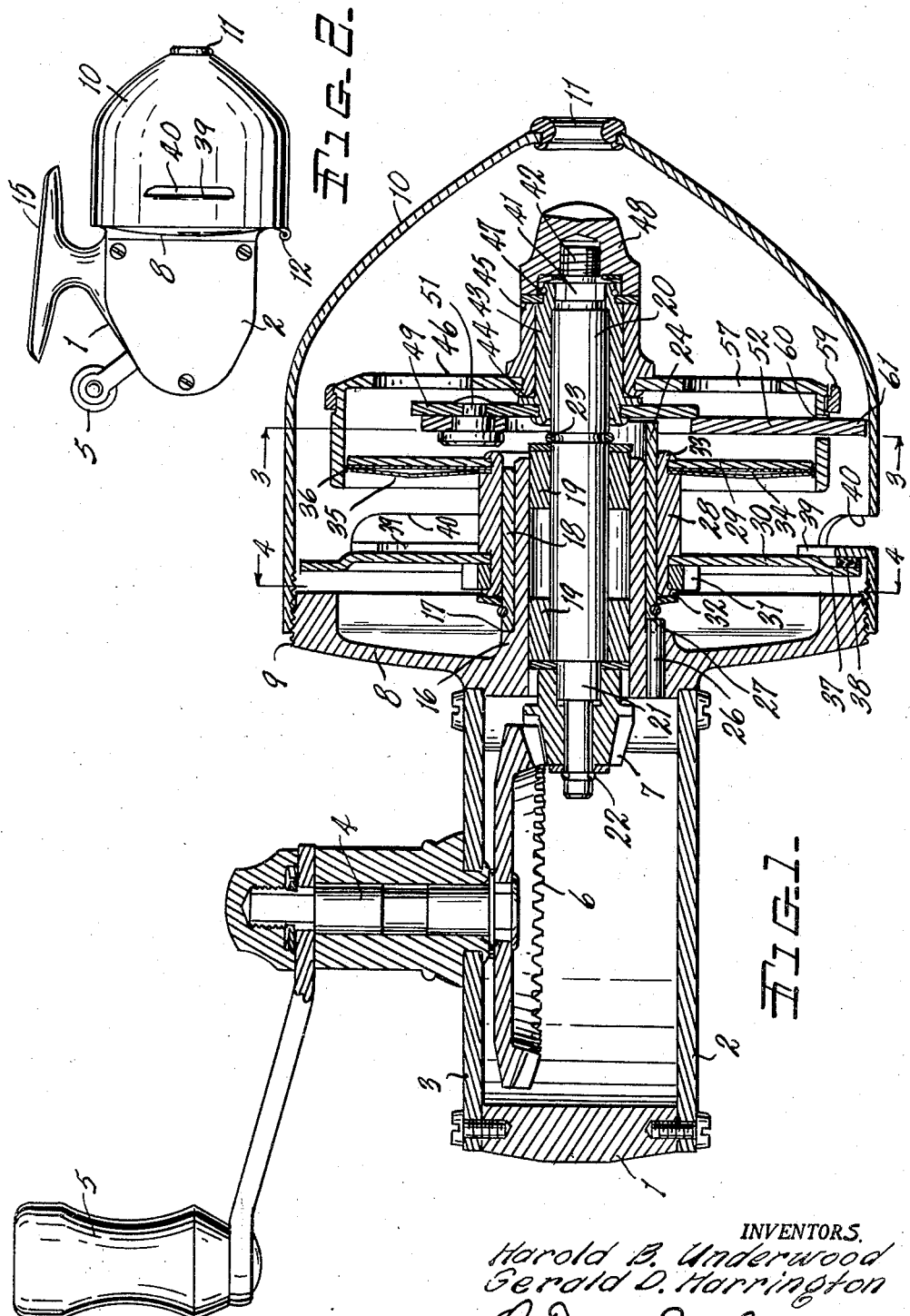

United States Patent Office 2,919,077
Patented Dec. 29, 1959

2,919,077

FISHING REEL OF THE TYPE KNOWN AS SPINNING REEL

Harold B. Underwood and Gerald D. Harrington, Kalamazoo, Mich., assignors to Shakespeare Company, Kalamazoo, Mich.

Application March 5, 1954, Serial No. 414,352

11 Claims. (Cl. 242—84.2)

This invention relates to improvements in fishing reels of the type known as spinning reels.

The principal objects of this invention are:

First, to provide a highly practical spinning reel having a minimum of parts and which can be economically manufactured and assembled.

Second, to provide a spinning reel with a rotatable line guide member engageable with an integral portion of the reel frame to limit reverse rotation of the line guide member.

Third, to provide a reel with a rotatable line guide member that is frictionally coupled to the line spool to assure smooth and continuous operation of the line guide member in picking up or retrieving line.

Fourth, to provide a spinning reel having a novel form of line guide member that is rotatably driven by a line pick-up member eccentrically and rotatably mounted within the line guide member to project automatically through the line guide member and rotate the latter upon forward rotation of the pick-up member.

Fifth, to provide a modified form of line guide member having a line pick-up member rotatably and eccentrically mounted within the line guide member to engage and drive the line guide member in a plurality of relatively adjusted positions of the pick-up member.

Sixth, to provide a novel form of spinning reel having a sheet metal housing adjustably secured to the frame of the reel and provided with integral friction flanges coacting with a rotatable spool within the housing.

Seventh, to provide an effective and inexpensive line pick-up mechanism that eccentrically mounts and guides a line pick-up member in a cylindrical line guide member to project and retract the line pick-up member and drive the line guide member.

Other objects of the invention will be apparent from a consideration of the following description and claims.

Fig. 1 is a horizontal longitudinal cross-sectional view through the reel taken along the planes of the broken line 1—1 in Fig. 3.

Fig. 2 is a side elevational view of the assembled reel.

Fig. 3 is a fragmentary transverse cross-sectional view taken along the plane of the line 3—3 in Fig. 1 and illustrating the parts of the reel in line winding or retrieving position.

Fig. 4 is an elevational view looking rearwardly in the direction of line 4—4 in Fig. 1 with the housing, line guide member and line spool removed.

Fig. 5 is a fragmentary transverse cross-sectional view similar to Fig. 3 but illustrating the parts in non-winding position which conditions the reel for casting.

Fig. 6 is a fragmentary longitudinal cross-sectional view through the friction connection to the line guide member and taken along the plane of the line 6—6 in Fig. 3.

Fig. 7 is a fragmentary transverse cross-sectional view through a modified form of the reel, the view being similar to Fig. 3 and illustrating corresponding parts in corresponding relative positions.

The present reel constitutes an improvement of and embodies some features of the spinning reel disclosed in the patent to Henry G. Shakespeare and Gerald D. Harrington, No. 2,521,543, issued September 5, 1950. As in this prior patent the reel includes a gear case 1 having removable side plates 2 and 3. A shaft 4 is journaled in the side plate 3 and provided with a crank 5 on its outer end. A bevel gear 6 is connected to the shaft within the gear case 1 and meshes with a bevel pinion 7 also within the gear case.

The forward end of the gear case is enlarged in an integral circular wall 8 forming the back wall of the reel housing. The periphery of the wall 8 is externally threaded as at 9 and adjustably coacts with internal threads formed in the rear of the cylindrical sheet metal housing 10. The forward end of the housing 10 is converged or tapered to an eye 11 through which the fish line is adapted to extend. As is more particularly shown in Figs. 2 and 4 the forward face of the wall 8 has a spring finger 12 secured thereto by a rivet 13 and the finger projects downwardly and rearwardly through a slot 14 provided therefor in the wall 8 to yieldably bear against the rear edge of the cylindrical housing 10 as appears in Fig. 2 to frictionally retain the housing in its adjusted position on the threads 9. The top of the gear casing is provided with an upwardly facing reel seat 15 appearing in Fig. 2.

Within the cylindrical housing 10, the wall 8 is provided with a centrally located forwardly projecting cylindrical bearing support 16 that is forwardly shouldered as at 17. The bearing support 16 receives and supports a tubular bushing 18 around its exterior and interiorly is provided with bearings 19 which rotatably support a spindle 20 having the previously mentioned bevel pinion 7 secured to its rear end. The rear end of the spindle 20 is provided with flattened surfaces 21 non-rotatably engaging the hub of the pinion 7 and the pinion is retained on the spindle by a snap ring 22. The spindle projects forwardly beyond the bearing support 16 and is axially retained by a second snap ring 23. The cylindrical bushing 18 has a semi-circular segmental portion 24 which projects forwardly from the remainder of the bushing along the lower left side as viewed in Fig. 4 and as appears in reverse in Figs. 3 and 5. The end edges of this segmental projection provide radially and laterally projecting stops 25 for a purpose which will be described presently. A pin 26 pressed through the wall 8 of the gear box engages in an axial slot in the rear end of the bushing 18 as at 27 in Fig. 1 to prevent rotation of the bushing 18.

Rotatably mounted on the exterior of the bushing 18 is the line spool consisting of a tubular hub 28 and front flange 29 and rear flange 30. Rearwardly of the rear flange 30 is a serrated click wheel 31 clamped to the hub and the rear flange by turning outwardly the end of the hub as at 32. The front flange 29 of the spool is retained on the hub by turning outwardly the forward end of the hub as at 33. A thin flexible plate 34 made of plastic or some similar material is faced along the rear or inner side of the front flange 29 and held in place by the annular dished springable retainer 35. The periphery of the ring 34 projects slightly beyond the edge of the front flange 29 as at 36.

The rear flange 30 of the spool is rearwardly offset around its periphery 37 to form an annular friction surface which is engaged by and coacts with friction faces 38 mounted on the rear sides of segmental flanges 39 struck inwardly from the sides of the cylinder housing 10 at angularly spaced positions around the housing. The formation of the flanges 39 performs the dual function of providing drain openings 40 in the housing so that the providing drain openings 40 in the housing so that thte water carried into the housing with the line can drain away. By adjusting the housing 10 on the threads 9 the degree of braking friction applied to the surface 37 and line spool can be adjusted to suit the desires of the angler.

The forward end of the spindle 20 is provided with a flattened portion 41 and a threaded stud 42 forwardly of the flattened portion. A bushing 43 is sleeved on the forward end of the spindle and provided with flat surfaces non-rotatably engaged with the flattened portion 41 of the spindle so that the bushing rotates with the spindle. The exterior of the bushing is provided with a forwardly facing shoulder 44 and relatively rotatably receives the hub 45 of a line guide member indicated generally at 46. The line guide member is permanently and rotatably retained on the bushing by a snap ring 47. The bushing 43 and line guide member are removably retained on the forward end of the spindle by a nut 48 threaded on the end of the spindle.

The rear end of the bushing 43 has a line pick-up arm 49 non-rotatably secured thereto by turning the rear end of the bushing outwardly as at 50. The arm 49 carries a pivot pin 51 disposed eccentrically with respect to the spindle 20 and the pin 51 pivotally supports a line pick-up member 52 which is lapped alongside of the arm 49 and disposed in chordal relation to the line guide member 46.

As is best illustrated in Figs. 3 and 5 the inner side of the pick-up member 52 is provided with a hook forming notch 53 the edge of which is adapted to engage the previously mentioned laterally facing stop 25 on the end of the spool bushing 18 when the spindle and pick-up arm are rotated rearwardly as shown in Fig. 5. The pick-up arm 49 is further provided with an integral finger 54 which is bent rearwardly as at 55 into the plane of the pick-up member 52 to act as a stop and guide for the pick-up member and limit rotation of the pick-up member 52 about its pivot inwardly of the line guide member.

The line guide member 46 includes the forward center plate 56 which is cut away or apertured as at 57 for lightness and a rearwardly extending cylindrical flange 58. A hardened and polished wear ring 59 is loosely and rotatably mounted around the forward edge of the line guide member to engage and support the fish line as it travels over the line guide member between the spool 28 and the eye 11 in the housing. The cylindrical flange 58 of the line guide member extends rearwardly and embraces the front flange 29 of the spool. The previously mentioned projecting edge 36 of the flexible plate 34 rubs against the inside of the cylindrical flange 58 to prevent the fish line from becoming entangled between the line guide member and the spool.

The cylindrical flange 58 of the line guide member is provided with an opening 60 which receives and passes a pick-up finger 61 formed integrally on the outer end of of the pick-up member 52. The previously mentioned stop finger 54 on the pick-up arm keeps the pick-up finger 61 in registry with the opening 60. The outer end of the pick-up member 52 adjacent to the finger 61 forms a stop 62 which engages the inside of the cylindrical flange 58 to limit motion of the pick-up finger 61 as is shown in Fig. 3. The relative positions of the opening 60 in the line guide member and the hook surface 53 on the pick-up member are arranged with respect to the stop 25 on the bushing 18 in such a manner that the finger 61 is disposed upwardly as shown in Fig. 5 when the hook surface engages the stop 25 to retract the line guide member. In this position gravity will assist in returning or retracting the pick-up finger.

The center plate 56 of the line guide member carries on its inner face an angled spring arm 63 anchored in place by a rivet 64. The rear springable end of the arm 63 carries a friction pad 65 which is positioned to rub against the front flange 29 of the line spool. The friction pad 65 places a small amount of drag on the line guide member so that a definite minimum forward rotating force must be applied to the spindle and the line guide member to rotate the same in line retrieving direction. This prevents intermittent and irregular variations in the tension of the fish line which occur in playing a fish from permitting the line guide member 46 to over travel or move ahead of the spindle 20 and pick-up arm 49 to unintentionally retract the pick-up finger 61.

When it is desired to condition the reel for casting the spindle 20 and pick-up arm 49 are reversely rotated and the eccentric mounting of the pick-up member 52 on the pick-up arm retracts the pick-up finger 61 to within the cylindrical flange 58. Engagement of the stop finger 54 on the pick-up arm 49 with the pick-up member 52 moves the finger 61 into engagement with the trailing edge of the opening 60 and reversely rotates the line guide member until the hook notch 53 engages the stop 25 as previously explained. The positive stopping of the line guide member and the crank 5 indicates to the angler that the pick-up finger 61 is retracted and that the reel is in condition for casting. The abrupt stopping of the line guide member 46 by the stop 25 causes the wear ring 59 to rotate slightly on the line guide member thus distributing any wear caused by the line around the wear ring.

The forward face of the wall 8 carries a detent 66 which coacts with the serrated click wheel 31 on the line spool to indicate when the spool is rotating. The detent 66 is pivotally mounted on a stud 67 and yieldably biased to engage the click wheel by the spring 68 carried by the stud 69.

The modified form of the reel shown in Fig. 7 provides a somewhat simpler line guide assembly. The cylindrical flange 58–A of the line guide member is provided with a plurality of angularly spaced openings 60–A with inwardly struck lugs 160 at their leading edges. The line pick-up arm 49–A mounted within the line guide member is a simple rectangular plate that the eccentric pivot 51–A of the pickup member 52–A is mounted on. The pick-up member 52–A is provided with a projecting pick-up finger 61–A adapted to project through any one of the openings 60–A on forward rotation of the pick-up arm or retraction within the flange 58–A and cam over the lugs 160 on reverse rotation of the pick-up arm. The outer end of the pick-up member 52–A is notched to bridge the lugs 160 while providing an outward facing limit stop 62–A on the pick-up member.

The modified form of the line guide member and line pick-up member has the advantage of conditioning the reel to retrieve line in a plurality of adjusted positions of the spindle with respect to the line guide member and similarly to permit casting in a plurality of positions by simply reversing the rotation of the spindle. No definite casting position is necessary and the stop 25 of the first form of the reel is unnecessary. However, the retracting action of the pick-up finger 61–A is not so positively controlled in that there is no stop to positively retract the pick-up member 52–A from the flange 58–A. The other elements of the modified reel including the spindle 20 and cylindrical housing 10 may be the same as in the preferred form of the invention.

In both forms of the reel a single bearing or bushing element 43 functions to connect the line pick-up mechanism to the spindle and rotatably support the line guide member on the spindle. The parts are easily dis-assembled for cleaning and oiling by simply removing the nut 48 and sliding the line guide member and bushing from the spindle. This exposes and permits removal of the line spool so that a substitute spool carrying a different type of line can easily be installed if desired.

Having thus described the invention, what is claimed to be new and desired to be secured by Letters Patent is:

1. In a spinning reel having a rotatable line spool with a rotatable spindle projecting coaxially therethrough and forwardly therefrom, the combination of a bearing member non-rotatably engaged with the projecting end of said spindle, a nut removably retaining said bearing member on said spindle, a cylindrical line guide member having a hub rotatably mounted on said bearing member and embracing the front flange of said spool, a line wind arm non-rotatably carried by said bearing member within said guide member, a line wind member pivotally secured to said arm at a point eccentric to said spindle and lapped alongside of said arm, a line wind finger on the free end of said line wind member, said finger being aligned with and adapted to be projected through an opening provided therefor in said guide member, a stop on said line wind member engageable with the inside of said guide member to limit outward projection of said line wind member, and a lug on said arm engageable with the inner side of said line wind member to hold said finger in registry with the opening in said guide member.

2. In a spinning reel having a line spool with a rotatable spindle projecting coaxially therethrough and forwardly therefrom, the combination of a bearing member non-rotatably engaged with the projecting end of said spindle, means removably retaining said bearing member on said spindle, a cylindrical line guide member having a hub rotatably mounted on said bearing member and embracing the front flange of said spool, a line wind arm non-rotatably carried by said bearing member within said guide member, a line wind member pivotally secured to said arm at a point eccentric to said spindle and lapped alongside of said arm, a line wind finger on the free end of said line wind member, said finger being adapted to be projected through an opening provided therefor in said guide member, a stop on said line wind member engageable with the inside of said guide member to limit outward projection of said line wind member, and a lug on said arm engageable with the inner side of said line wind member to hold said finger in registry with the opening in said guide member.

3. In a spinning reel having a line spool with a rotatable spindle projecting coaxially therethrough and forwardly therefrom, the combination of a bearing member non-rotatably engaged with the projecting end of said spindle, means removably retaining said bearing member on said spindle, a cylindrical line guide member having a hub rotatably mounted on said bearing member and embracing the front flange of said spool, a line wind arm non-rotatably carried by said bearing member within said guide member, a line wind member pivotally secured to said arm at a point eccentric to said spindle and lapped alongside of said arm, a line wind finger on the free end of said line wind member, said finger being aligned with and adapted to be projected through an opening provided therefor in said guide member, a stop on said line wind member engageable with the inside of said guide member to limit outward projection of said line wind member, and a lug bent from the plane of said arm and engageable with the inner side of said line wind member to hold said finger in registry within the opening in said guide member.

4. In a spinning reel having a line spool with a spindle rotatable relative thereto and projecting coaxially therethrough and forwardly therefrom, the combination of a bearing member non-rotatably engaged with the projecting end of said spindle, means removably retaining said bearing member on said spindle, a line guide member having a hub rotatably mounted on said bearing member and having a rearwardly projecting cylindrical flange embracing the front flange of said spool, a line wind arm non-rotatably carried by said bearing member rearwardly of said guide member hub and within said guide member, a line wind member pivotally secured to said arm at a point eccentric to said spindle and lapped alongside of said arm, a line wind finger on the free end of said line wind member, said finger being adapted to be projected through an opening provided therefor in said guide member and alternatively retracted within the periphery of said guide member, and a stop on said line wind member engageable with the inside of said guide member to limit outward projection of said line wind member.

5. In a spinning reel having a line spool with a spindle rotatable relative thereto and projecting coaxially therethrough and forwardly therefrom, the combination of a bearing member non-rotatably engaged with the projecting end of said spindle, means removably retaining said bearing member on said spindle, a line guide member having a hub rotatably mounted on said bearing member and having a rearwardly projecting cylindrical flange embracing the front flange of said spool, a line wind arm non-rotatably carried by said bearing member rearwardly of said guide member hub and within said guide member, a line wind member pivotally secured to said arm at a point eccentric to said spindle, a line wind finger on the free end of said line wind member, said finger being adapted to be projected through an opening provided therefor in said guide member and alternatively retracted within the periphery of said guide member, and a stop on said line wind member engageable with the inside of said guide member to limit outward projection of said line wind member.

6. In a spinning reel having a line spool with a rotatable spindle projecting coaxially therethrough and forwardly therefrom, the combination of a bearing member non-rotatably engaged with the projecting end of said spindle, means removably retaining said bearing member on said spindle, a cylindrical line guide member having a hub rotatably mounted on the outer end of said bearing member and embracing the front flange of said spool, a line wind arm non-rotatably carried by the inner end of said bearing member within said guide member in immediate facing relation to said spool, a line wind member pivotally secured to said arm at a point eccentric to said spindle and lapped alongside of said arm, a line wind finger on the free end of said line wind member, said finger being adapted to be projected through an opening provided therefor in said guide member, a stop on said line wind member engageable with the inside of said guide member to limit outward projection of said line wind member, and another stop coacting between said arm and said line wind member to limit inward rotation of said line wind member about its pivot toward said spindle.

7. In a spinning reel having a line spool with a spindle rotatable relative thereto and projecting coaxially therethrough and forwardly therefrom, the combination of a bearing member non-rotatably engaged with the projecting end of said spindle, means removably retaining said bearing member on said spindle, a cylindrical line guide member having a hub rotatably mounted on the outer end of said bearing member and having a rearwardly projecting cylindrical flange embracing the front flange of said spool, a line wind arm non-rotatably carried by the inner end of said bearing member within said guide member rearwardly of said guide member hub, a line wind member pivotally secured to said arm at a point eccentric to said spindle and lapped alongside of said arm, a line wind finger on the free end of said line wind member, said finger being adapted to be projected through any one of a plurality of openings provided therefor in said guide member and retracted inwardly of said openings, a stop on said line wind member engageable with the inside of said guide member to limit outward projection of said line wind member and drivingly engage said line guide member with said line wind member and said arm, and lugs on said guide member engageable with the leading side of said line wind member on reverse rotation thereof to cam said finger over the openings in said guide member.

8. In a spinning reel having a line spool with a spindle rotatable relative thereto and projecting coaxially therethrough and forwardly therefrom, the combination of a bearing member non-rotatably engaged with the projecting end of said spindle, means removably retaining said bearing member on said spindle, a cylindrical line guide member having a hub rotatably mounted on the outer end of said bearing member and having a rearwardly projecting cylindrical flange embracing the front flange of said spool, a line wind arm non-rotatably carried by the inner end of said bearing member within said guide member rearwardly of said guide member hub, a line wind member pivotally secured to said arm at a point eccentric to said spindle, a line wind finger on the free end of said line wind member, said finger being adapted to be projected through an opening provided therefor in said guide member and retracted inwardly of said openings, a stop on said line wind member engageable with the inside of said guide member to limit outward projection of said line wind member and drivingly engage said line guide member with said line wind member and said arm, and a lug on said guide member engageable with the leading side of said line wind member on reverse rotation thereof to cam said finger over the opening in said guide member.

9. In a spinning reel having a line spool with a spindle rotatable relative thereto and projecting coaxially therethrough and forwardly therefrom, the combination of a bearing member non-rotatably engaged with the projecting end of said spindle, means removably retaining said bearing member on said spindle, a line guide member having a hub rotatably mounted on said bearing member and having a rearwardly projecting cylindrical flange embracing the front flange of said spool, a line wind arm non-rotatably carried by said bearing member rearwardly of said guide member hub and within said guide member, a line wind member pivotally secured to said arm at a point eccentric to said spindle, a line wind finger on the free end of said line wind member, said finger being adapted to be projected through and retracted inwardly of an opening provided therefor in said guide member, and a stop on said line wind member engageable with the inside of said guide member to limit outward projection of said line wind member and drivingly engage said arm with said line wind member.

10. In a spinning reel, a fixed cylindrical support with a spindle projecting axially therethrough, a spool rotatably mounted on said support, a segmental axial projection on the end of said support extending forwardly of said spool, an arm drivingly connected to said spindle forwardly of said segmental projection, a line guide member relatively rotatably mounted on said spindle forwardly of said arm and having a cylindrical flange embracing said arm and the front flange of said spool, a line pick-up finger pivoted on said arm at a point outside of said projection, said finger being adapted to be projected outwardly through an opening provided therefor in said flange and into driving engagement therewith upon advance rotation of said spindle, and a radially inwardly and angularly facing stop on said finger engageable with the end of said projection upon reverse rotation of said spindle and retraction of said finger within the periphery of said flange.

11. In a spinning reel, a fixed cylindrical support with a spindle projecting axially therethrough, a spool mounted on said support, a segmental axial projection on the end of said support extending forwardly of said spool, an arm drivingly connected to said spindle forwardly of said segmental projection, a line guide member relatively rotatably mounted on said spindle forwardly of said arm and having a cylindrical flange embracing said arm and the front flange of said spool, a line pick-up finger pivoted on said arm at a point outside of said projection, said finger being adapted to be projected outwardly through an opening provided therefor in said flange and into driving engagement therewith upon advance rotation of said spindle, and a radially inwardly and angularly facing stop on said finger engageable with the end of said projection upon reverse rotation of said spindle and retraction of said finger within the periphery of said flange.

References Cited in the file of this patent

UNITED STATES PATENTS

| | | |
|---|---|---|
| 2,283,039 | Bremiller | May 12, 1942 |
| 2,521,543 | Shakespeare et al. | Sept. 5, 1950 |
| 2,630,979 | Uerling | Mar. 10, 1953 |
| 2,706,095 | Goodall | Apr. 12, 1955 |
| 2,707,597 | Rotsler | May 3, 1955 |
| 2,724,563 | Shakespeare et al. | Nov. 22, 1955 |
| 2,736,510 | Skelton | Feb. 28, 1956 |
| 2,755,034 | Eisele | July 17, 1956 |